(12) United States Patent
Fritz et al.

(10) Patent No.: US 10,570,338 B2
(45) Date of Patent: Feb. 25, 2020

(54) METHOD AND SYSTEM FOR PROCESSING A MIXTURE OF SUBSTANCES CONTAINING HYDROCARBONS AND SULFUR COMPOUNDS BY SEPARATION TECHNOLOGY

(71) Applicant: Linde Aktiengesellschaft, München (DE)

(72) Inventors: Helmut Fritz, München (DE); Ulrike Stiglmayr, Hettenshausen (DE)

(73) Assignee: LINDE AKTIENGESELLSCHAFT, Munich (DE)

( * ) Notice: Subject to any disclaimer, the term of this patent is extended or adjusted under 35 U.S.C. 154(b) by 18 days.

(21) Appl. No.: 15/760,927

(22) PCT Filed: Sep. 15, 2016

(86) PCT No.: PCT/EP2016/071904
§ 371 (c)(1),
(2) Date: Jul. 20, 2018

(87) PCT Pub. No.: WO2017/046286
PCT Pub. Date: Mar. 23, 2017

(65) Prior Publication Data
US 2018/0340124 A1   Nov. 29, 2018

(30) Foreign Application Priority Data

Sep. 18, 2015   (EP) .................................... 15185900

(51) Int. Cl.
*C10G 7/00*   (2006.01)
*B01D 3/14*   (2006.01)

(52) U.S. Cl.
CPC ............... *C10G 7/00* (2013.01); *B01D 3/143* (2013.01)

(58) Field of Classification Search
CPC .......... B01D 3/143; C10G 7/00; C10G 45/02; C10G 45/32; C10G 69/06
See application file for complete search history.

(56) References Cited

U.S. PATENT DOCUMENTS 3,310,592 A    3/1967   Junichi et al.
4,397,739 A *  8/1983   Jacquin ................. C10G 69/02
                                                    208/210

(Continued)

FOREIGN PATENT DOCUMENTS

CN   103059957 A   4/2013
CN   103059964 A   4/2013

OTHER PUBLICATIONS

International Search Report of PCT/EP2016/071904 dated Dec. 12, 2016, 2 pp.

(Continued)

*Primary Examiner* — Jonathan Miller
(74) *Attorney, Agent, or Firm* — Lathrop GPM LLP

(57) ABSTRACT

A method (100) is proposed for processing a mixture of substances which contains predominantly or solely hydrocarbons having from M to N carbon atoms, which include sulfur-containing hydrocarbons, a first feed being formed using fluid of the mixture of substances and being subjected to a first separation in which a first fraction is formed which contains predominantly or solely hydrocarbons having from X to Y carbon atoms and at least a portion of the sulfur-containing hydrocarbons contained in the first feed, and a second feed being formed using fluid of the first fraction and being subjected to a desulfurisation, in which the sulfur-containing hydrocarbons contained in the second feed are converted predominantly or completely and hydrocarbons having more than Y carbon atoms are formed as secondary products, with the result that a product mixture of the desulfurisation contains predominantly or solely hydrocar- (Continued)

bons having from X to Y carbon atoms and the secondary products, where M is five or six, X is five or six when M is five or is six when M is six, Y is an integer of six, seven or eight, and N is an integer greater than Y. It is provided that a third feed is formed using fluid of the product mixture and is subjected to a second separation in a two-part distillation column (30) which comprises two structurally separated column parts (31, 32) and in which a second and a third fraction are formed, the second fraction containing at least the predominant portion of the secondary products contained in the third feed, and fluid of the third fraction being separated further in the two-part distillation column in a third separation. The present invention likewise relates to a corresponding system.

14 Claims, 1 Drawing Sheet

(56) References Cited

U.S. PATENT DOCUMENTS

| | | | | |
|---|---|---|---|---|
| 6,946,068 B2 * | 9/2005 | Groten | ..................... | B01J 23/44 203/28 |
| 8,628,656 B2 * | 1/2014 | Podrebarac | ............ | C10G 45/08 208/208 R |
| 8,906,969 B2 * | 12/2014 | Iwama | ..................... | C07C 1/04 518/700 |
| 10,144,883 B2 * | 12/2018 | Konda | ................... | C10G 65/06 |
| 2003/0092952 A1 | 5/2003 | Netzer | | |
| 2010/0137661 A1 | 6/2010 | Brown | | |
| 2011/0036753 A1 * | 2/2011 | Tasaka | ..................... | C10G 2/30 208/88 |
| 2012/0048776 A1 * | 3/2012 | Podrebarac | ............ | C10G 45/08 208/97 |
| 2013/0143971 A1 * | 6/2013 | Iwama | ..................... | C07C 1/04 518/700 |
| 2018/0280827 A1 * | 10/2018 | Ladkat | ..................... | C10L 3/12 |

OTHER PUBLICATIONS

Chinese Patent Application No. 201680054305.8, First Office Action dated Jan. 7, 2020, 5 pages.

English translation of the International Preliminary Report on Patentability of PCT/EP2016/071904 dated Aug. 23, 2017, 5 pp.

* cited by examiner

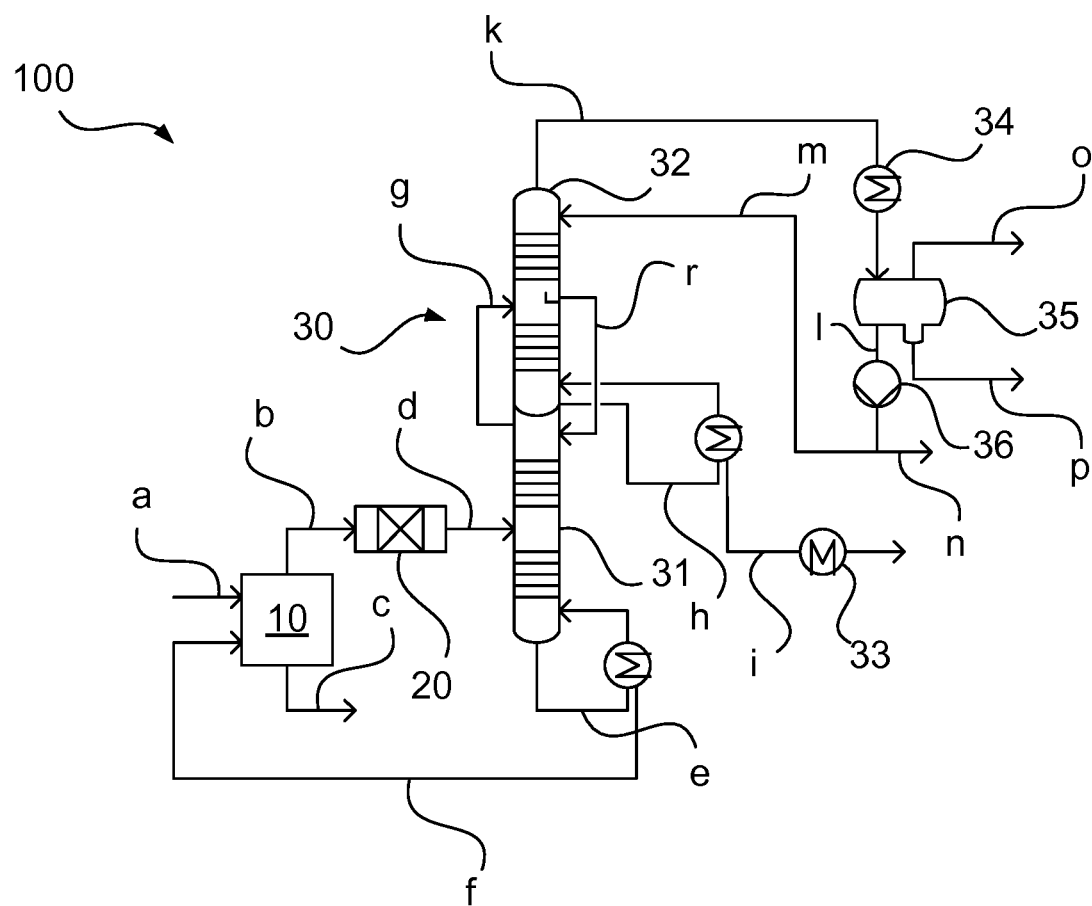

METHOD AND SYSTEM FOR PROCESSING A MIXTURE OF SUBSTANCES CONTAINING HYDROCARBONS AND SULFUR COMPOUNDS BY SEPARATION TECHNOLOGY

The invention relates to a method and a system for processing a mixture of substances containing hydrocarbons and sulfur compounds by separation technology, according to the respective preambles of the independent claims.

PRIOR ART

Methods and devices for steam cracking hydrocarbons are known and are described, for example, in the article "Ethylene" in Ullmann's Encyclopedia of Industrial Chemistry, online since 15 Apr. 2007, DOI 10.1002/14356007.a10_045.pub2.

Steam cracking yields mixtures of substances which, after water and oil-like components, where present (known as pyrolysis oil), have been separated off, substantially contain hydrogen, methane and hydrocarbons having more than two carbon atoms. Such mixtures of substances can be separated in different separation sequences, as are known in principle to a person skilled in the art and likewise described in the mentioned article.

The present invention relates predominantly to the treatment by separation technology of what is known as pyrolysis gasoline or fractions thereof, as are obtained in what is known as the gasoline pathway of corresponding separation sequences. As indicated, for example, in the mentioned article "Ethylene" in Ullmann's Encyclopedia of Industrial Chemistry, pyrolysis gasoline is typically a mixture of substances which contains hydrocarbons having from five to ten, depending on the definition also from five to twelve, carbon atoms and is also rich in aromatic compounds.

The present invention can, however, also be used for processing comparable fractions which contain hydrocarbons having more and/or fewer carbon atoms than the indicated number and/or which are lower in aromatic compounds than conventional pyrolysis gasoline, as set out in detail below. In particular, however, such fractions originate from a mixture of substances that is obtained by means of a method for steam cracking and is separated and treated in a comparable manner to pyrolysis gasoline.

Unless a corresponding hydrogenation has already taken place, the non-aromatic compounds contained in pyrolysis gasoline are for the most part unsaturated and comprise a high proportion of acetylenes and dienes. Pyrolysis gasoline is therefore unstable and cannot be stored for a prolonged period because the unsaturated compounds tend to undergo polymerisation reactions. Conventionally, therefore, what is known as selective hydrogenation is first carried out, in which the acetylenes and dienes as well as styrene that is present are converted at least for the most part into olefinic compounds. The pyrolysis gasoline processed in a corresponding step, known as the first stage, is in principle already suitable for use as a fuel, but it still contains a considerable proportion of sulfur-containing compounds. These include, for example, sulfur-containing hydrocarbons such as thiophenes, mercaptans and sulfides, and heavier sulfur-substituted compounds. These must be removed for reasons of emission protection. Also undesirable in fuel are larger amounts of aromatic compounds, in particular benzene. Such compounds additionally have a higher market value than the fuel itself, and therefore it is desirable to obtain the aromatic compounds as products.

The selective hydrogenation, that is to say the first stage, is therefore followed, for example, by a separation into a fraction of hydrocarbons having (predominantly) five carbon atoms, a fraction of hydrocarbons having (predominantly) from six to eight carbon atoms, and a fraction of hydrocarbons having (predominantly) more than nine carbon atoms. The fraction of hydrocarbons having (predominantly) from six to eight carbon atoms, which is also referred to as the heart cut, is conventionally first subjected to a further catalytic (full) hydrogenation, known as the second stage, in which olefins are converted into paraffins and naphthenes. This hydrogenation conventionally also includes a conversion of sulfur-containing hydrocarbons which are already present in the pyrolysis gasoline and have passed into the mentioned fraction, whereby hydrogen sulfide is formed. The hydrogen sulfide is driven out of the mentioned fraction in a subsequent step. However, the conversion of the sulfur-containing hydrocarbons can also take place without a simultaneous hydrogenation of the olefins. The conversion of the sulfur-containing hydrocarbons is also referred to in the prior art as hydrodesulfurisation (HDS). If the term "desulfurisation" is used in the following, it may be a corresponding method for only converting the sulfur-containing hydrocarbons, or a method in which hydrogenation of the olefins additionally takes place. After the desulfurisation, the aromatic compounds, in particular benzene, xylenes and toluene (known as BTX), are separated from the heart cut, extractive methods, in particular extractive distillation, being used.

In addition to the mentioned heart cut of hydrocarbons having (predominantly) from six to eight carbon atoms, it is in principle also possible to obtain other fractions, as explained below. For example, in this context, if starting fractions having corresponding components are present, it is possible to obtain a lighter fraction having (predominantly) six and optionally fewer carbon atoms and a heavier fraction having (predominantly) seven or more carbon atoms (referred to as C6/C7 separation), a lighter fraction having (predominantly) seven or fewer carbon atoms and a heavier fraction having (predominantly) eight or more carbon atoms (C7/C8 separation), or a lighter fraction having (predominantly) eight or fewer carbon atoms and a heavier fraction having (predominantly) nine or more carbon atoms (C8/C9 separation). The lighter fraction in each case is subjected to the desulfurisation and then the obtainment of the aromatic compounds. In this case, the lower limit of the number of carbons in the hydrocarbons contained in the lighter fractions is typically five or six.

A disadvantage of the known methods is that the desulfurisation yields, as secondary products, heavier hydrocarbons having higher numbers of carbon atoms than were previously contained in the fraction subjected to desulfurisation. This applies to both the conventional heart cut as well as the other "lighter" fractions mentioned above. These heavier hydrocarbons can interfere with the extractive methods for obtaining the aromatic compounds because they accumulate in the extracting agent used and lead to what is known as fouling, and to losses of extracting agent.

US 2010/0137661 A1 relates to the production of cumene from benzene. The benzene can be obtained from a mixture of substances which is formed by steam cracking of naphtha. US 2003/092952 A1 and U.S. Pat. No. 3,310,592 A relate to a method for combined production of purified benzene and ethylene and to a method for producing high purity benzene.

The object of the present invention is to provide improved possibilities for processing by separation corresponding mixtures of substances.

DISCLOSURE OF THE INVENTION

This object is achieved by a method and a system for processing a mixture of substances containing hydrocarbons by separation technology, having the features of the independent claims. The dependent claims and the following description relate to embodiments.

Before the features and advantages of the present invention are explained, the underlying principles thereof and the terms used will be explained.

In the language used herein, liquid and gaseous streams, feeds, products and the like (shortened to "mixtures of substances" in the following) can be rich or poor in one or more components, where "rich" can denote a content of at least 75%, 90%, 95%, 99%, 99.5%, 99.9% or 99.99% and "poor" can denote a content of not more than 25%, 10%, 5%, 1%, 0.1% or 0.01%, based on moles, weight or volume. The term "predominantly" can in particular correspond to the definition of "rich". In the language used herein, mixtures of substances can further be enriched in or depleted of one or more components, these terms relating to a corresponding content in a starting mixture of substances from which the mixture of substances in question was formed. After an "enrichment", at least a 1.1-fold, 1.5-fold, 2-fold, 5-fold, 10-fold, 100-fold or 1000-fold content of a corresponding component is present, and after a "depletion" not more than a 0.9-fold, 0.5-fold, 0.1-fold, 0.01-fold or 0.001-fold content is present, based on the content in the respective starting mixture of substances.

A corresponding mixture of substances is "derived" or "formed" from another mixture of substances when it contains at least some components that are present in or obtained from the other mixture of substances. A mixture of substances that is derived within this meaning can be obtained from the other mixture of substances, for example by separation or diversion of a portion or of one or more components, enrichment or depletion in respect of one or more components, chemical or physical conversion of one or more components, heating, cooling, application of pressure and the like.

If it is stated herein that a mixture of substances is formed "using fluid" of another mixture of substances, this can mean that the entire other mixture of substances is used to form the mixture of substances, but the mixture of substances can also be formed using only a portion of the other mixture of substances or using further components or mixtures of substances. For example, a second mixture of substances formed "using fluid" of a first mixture of substances can also contain a portion of a third mixture of substances and does not need to contain the whole of the first mixture of substances.

In the mentioned methods, distillation columns in particular can be used. Regarding the design and configuration of corresponding devices, reference is made to relevant textbooks (see, for example, K. Sattler: Thermische Trennverfahren. Grundlagen, Auslegung, Apparate. ['*Thermal separation methods. Principles, design, apparatus*'], Weinheim: Wiley-VCH, 3rd edition, 2001). Distillation columns and absorption columns are also combined in the following under the term "separating columns". At least a liquid fraction ("bottom product") and a gaseous fraction ("top product") can typically be withdrawn from a separating column in a lower region ("bottom") or upper region ("top"), respectively.

In the language used herein, a "distillation column" is a separating column which is designed to separate, at least in part, a mixture of substances (fluid) provided in gaseous or liquid form or in the form of a two-phase mixture having liquid and gaseous components, optionally also in the supercritical state, that is to say to produce from the mixture of substances pure substances or mixtures of substances respectively, which, as compared with the mixture of substances, are enriched in or depleted of or rich or low in at least one component, in the above-mentioned sense. Typically, distillation columns are in the form of cylindrical metal containers which are equipped with built-in components, for example sieve trays or structured or random packings. A gaseous fluid formed in an upper region of the distillation column using the mixture of substances fed in is also referred to as the "top product", and a liquid fluid formed in a lower region of the distillation column using the mixture of substances fed in is also referred to as the "bottom product". A distillation column is distinguished inter alia in that a portion of the bottom product is continuously heated by means of what is known as a bottom reboiler, is vaporised thereby, and rises in gas form in the distillation column. A distillation column is typically further provided with what is known as a top condenser, in which at least a portion of the top product is liquefied to form a condensate and is discharged as liquid reflux at the top of the distillation column. A portion of the top product and of the bottom product can also each be used in a different way, for example as a product.

In the language used herein, a distillation column has a "two-part" configuration when it has (at least) two structurally separate regions or column parts, namely a "first" and a "second" column part. In this case, a mixture of substances is fed into the first column part, where it is processed by separation technology in a defined manner. A top product of the first column part is transferred at least in part into the second column part, where it is processed by separation technology. A liquid formed in the second column part is fed to the first column part. The mentioned "structural separation" includes in this case at least means which prevent a liquid from running from the second column part into the first column part, for example a liquid barrier tray. In a two-part distillation column, liquid from the second column part is therefore guided out of the second column part by means of pipes and then transferred in a controlled manner, for example using suitable control devices, into the first column part. If a liquid barrier tray is used, gas from the first column part can nevertheless rise into the second column part. A structural separation can, however, also include means, as is the case in particular within the scope of the present invention, which prevent gas from rising from the first column part into the second column part. In this case, the gas is guided out of the first column part by means of pipes and then transferred in a controlled manner, for example likewise using suitable control devices, to the second column part. At least the first column part has a bottom reboiler and the second column part has a top condenser. However, since, as mentioned, a liquid formed in the second column part is fed to the first column part, no top condenser is required for the first column part at least. A two-part column can be a structural unit, that is to say the first and the second column part can be arranged in a common outer shell. This offers advantages, for example, in terms of insulation. Typically, the second part is arranged completely above the first column part, that is to say the lowest point at which liquid collects in the second column part is geodetically above the highest point at which gas collects in the first column part. However, at least the point at which liquid to be transferred to the first column part is formed in the second column part is geodetically above the point at which the liquid is fed into the first column part. In this manner, liquid from the second column part can be transferred to the first column part without the aid of pumps and solely under the effect of gravity.

Advantages of the Invention

Against the background discussed at the beginning, the present invention proposes a method for processing a mixture of substances that contains predominantly or solely hydrocarbons having from M to N carbon atoms. The hydrocarbons include sulfur-containing hydrocarbons which are to be removed from the mixture of substances or converted by a desulfurisation process. A corresponding mixture of substances can in particular also be subjected beforehand to a first stage of a known pyrolysis gasoline hydrogenation and therefore also contain, for example, traces of dissolved residual hydrogen. The method according to the invention comprises, as is known in this respect, forming a first feed using fluid of the mentioned mixture of substances and subjecting it to a first separation. In this first separation, a first fraction is formed which contains predominantly or solely hydrocarbons having from X to Y carbon atoms, and at least a portion of the sulfur-containing hydrocarbons contained in the first feed.

A corresponding separation was discussed at the beginning with reference to the "lighter" and "heavier" fractions formed from corresponding mixtures of substances. The "first" fraction represents such a "lighter" fraction which, as likewise discussed, is contaminated in conventional desulfurisation processes with additional heavier hydrocarbon compounds as secondary products. After a desulfurisation process, the "first" or "lighter" fraction thus contains heavier hydrocarbons having a larger number of carbon atoms than was previously contained in the corresponding fraction.

In other words, within the scope of the present invention, a second feed is formed using fluid of the first fraction and is subjected to desulfurisation. In the desulfurisation, the sulfur-containing hydrocarbons present in the second feed are converted predominantly or completely and hydrocarbons having more than Y carbon atoms are formed as secondary products, with the result that or whereby a product mixture of the desulfurisation contains predominantly or solely hydrocarbons having from X to Y carbon atoms and the (heavier) secondary products. Corresponding desulfurisation methods are known to the skilled person from expert literature. The hydrocarbons having from X to Y carbon atoms can be the hydrocarbons already contained previously in the second fraction, but they can also be hydrogenation products of corresponding hydrocarbons, as discussed at the beginning. For example, within the context of such a desulfurisation, which at the same time represents a (full) hydrogenation, can include a conversion of olefins to paraffins and naphthenes, the number of carbon atoms of corresponding compounds not changing, however.

The present invention is suitable for a number of different processing methods and can in particular also include the formation of a conventional "heart cut" from a corresponding mixture of substances, as discussed above. Where present, hydrocarbons having four or fewer or five or fewer carbon atoms were separated from the mixture of substances (for example in a debutanizer or depentanizer or a corresponding device). Accordingly, within the scope of the present invention, M can be five or six, X can be five or six when M is five or can be six when M is six, Y can be an integer of six, seven or eight, and N can be an integer greater than Y. As follows from the definitions of X and Y, both the value for X and the value for Y can be six. Therefore, where hydrocarbons "having from X to Y carbon atoms" are mentioned above and in the following, they are in this special case only hydrocarbons having six carbon atoms. As mentioned, the present invention is suitable in particular for processing pyrolysis gasoline or fractions formed therefrom, in which the heaviest hydrocarbons present can initially have ten but also eleven or 12 carbon atoms. If a corresponding fraction is subjected, for example, to a first stage of a known pyrolysis gasoline hydrogenation, secondary products can form here too. Both the heavier hydrocarbons formed as secondary products in the first stage of the pyrolysis gasoline hydrogenation and the heavier hydrocarbons formed as secondary products in the desulfurisation of the above-mentioned first fraction are typically di- or oligomers of corresponding hydrocarbons and therefore in the present case have a number of carbon atoms of at least ten or twelve. In the mixture of substances subjected to the first feed, N can therefore also be significantly above ten, eleven or 12.

The method according to the invention is distinguished in that a third feed is formed using fluid of the product mixture and is subjected to a second separation in a two-part distillation column in which a second and a third fraction are formed. The two-part distillation column comprises, as mentioned above, two structurally separated column parts or regions, namely a first and a second column part. The two column parts are especially structurally separated as mentioned above. The second fraction contains at least the predominant portion of the secondary products contained in the third feed because the separation is performed accordingly.

Fluid of the second fraction is, according to the invention, used in the formation of the first feed, that is to say recycled into the method upstream of the separation to form the first fraction. If, in doing so, the second fraction or a part thereof is recycled into the first separation, hydrocarbons with Y and, as the case may be, less hydrocarbons contained in the second fraction bay be recovered and again subjected to the second separation in the two-part distillation column. In the framework of the present invention the second separation can be optimized in view of a maximum possible purity of the third fraction from heavier components. It may be accepted therein that a part of the desired hydrocarbons are transferred to the second fraction. These hydrocarbons are not lost because they end up in the third feed as a result of the recycling via the first separation and thus can be transferred to the subsequent separation steps. In this way, the separation is easier and can be performed with less apparative effort compared with a situation in which all desired hydrocarbons must be transferred completely to the third fraction. However, it is in principle also possible to discharge the second fraction from the method completely. In both embodiments just explained, hydrocarbons having more than Y carbon atoms, that is to say the secondary products, can no longer interfere with subsequent steps, in particular an extraction of aromatic compounds.

In particular, the present invention makes it possible to provide, as the third fraction, a fraction which contains at least the hydrocarbons having six and, in the case of corresponding values for Y, additionally the hydrocarbons having seven or seven and eight carbon atoms, which include corresponding aromatic compounds, this fraction being, however, low in or free of higher hydrocarbons. On account of the second separation, the third fraction is in particular low in or free of the secondary products having more than Y carbon atoms.

A simple partial vaporisation in a heat exchanger would not fulfil the required purity demands on account of the boiling behaviour of the secondary products. By using a two-part distillation column, as explained in the following, the preparation and operation of a corresponding system within the scope of the present invention are simplified significantly. An arrangement having two distillation columns, which is in principle also possible as an alternative, would require a separate bottom reboiler and a corresponding condenser system for each of these distillation columns. By using a two-part distillation column, however, it is possible to omit a condensation arrangement for one of the column parts.

Fluid of the second fraction can, as mentioned, be used in the formation of the first feed or can be discharged from the system. Fluid of the third fraction, in contrast, is further separated in the two-part distillation column in a third separation. The third fraction contains a portion of the hydrocarbons having Y and optionally fewer carbon atoms contained in the third feed, a portion of the corresponding hydrocarbons has passed into the second fraction. Since this third fraction is free or largely free of the mentioned heavier secondary products, it can be separated particularly simply in the third separation in respect of an extraction of aromatic compounds, that is to say lighter compounds can be separated off without a corresponding fraction which is left behind in the separation of the lighter components containing appreciable amounts of the secondary products.

Advantageously, a fourth feed is formed in this case using the fluid of the third fraction, which fourth feed is subjected to the mentioned third separation. In the third separation, a fourth and a fifth fraction are advantageously formed, the fourth fraction containing at least the predominant portion of the hydrocarbons having from six to Y carbon atoms contained in the fourth feed. The fourth fraction is then supplied, for example, to a further separation or to an extraction of aromatic compounds, without the mentioned secondary products interfering therewith. The fifth fraction, in contrast, is preferably low in or free of hydrocarbons having six carbon atoms and can contain, for example, lighter hydrocarbons having five carbon atoms, traces of dissolved hydrogen (from the desulfurisation), hydrogen sulfide and other light components. Because the corresponding fraction has previously passed through the mentioned steps, it is low in or free of aromatic compounds having six carbon atoms, in particular benzene, although traces may be present. Furthermore, a corresponding fifth fraction has already passed through a desulfurisation and is therefore already low in or free of sulfur-containing hydrocarbons. The fifth fraction can be recycled into the method, for example into a steam cracking step.

In other words, it is particularly advantageous within the scope of the present invention if the hydrocarbons having from M to N carbon atoms that are contained in the mixture of substances include aromatic compounds having six, six and seven or from six to eight carbon atoms, which are also contained at least in part in the fourth feed mixture, the fourth fraction containing at least the predominant portion of those aromatic compounds contained in the third feed mixture. These can be recovered in a particularly simple manner by the mentioned steps.

Within the scope of the present invention, M and X are advantageously five and Y, as mentioned, is six, seven or eight. In other words, the first fraction thus contains hydrocarbons having five and six, from five to seven or from five to eight carbon atoms. Furthermore, in the first separation, to which the first feed mixture is subjected, a further fraction is formed which contains predominantly or solely hydrocarbons having from Y to N carbon atoms. Within the scope of the present invention, the first separation can thus be what is known as a C6/C7 separation, a C7/C8 separation or a C8/C9 separation. The present invention is equally suitable for all such methods. In order to be able to bring about complete separation of compounds having more than Y carbon atoms from compounds having fewer than Y carbon atoms, it is necessary to adjust the separation conditions so that, in the first separation, hydrocarbons having Y carbon atoms pass both into the first fraction and into the further fraction.

As mentioned, the method according to the invention is suitable in particular for processing pyrolysis gasoline, where N is nine, ten, eleven or 12 or, if corresponding di- and oligomers are present, also significantly more than nine, ten, eleven or 12, and the mixture of substances is obtained as the pyrolysis gasoline fraction from a stream taken from a steam cracking method. The present invention permits in this case particularly efficient desulfurisation and extraction of aromatic compounds.

As mentioned, a two-part distillation column is used within the scope of the present invention. Said column comprises a first column part and a second column part arranged above the first column part. Both column parts can be arranged, for example, in a common outer shell, as mentioned above. The second separation advantageously takes place in the first column part and the third separation in the second column part, which in particular offers the advantages discussed in the following.

Advantageously, the second fraction is formed within the scope of the present invention from a bottom product of the first column part. The third fraction, in contrast, is formed from a top product of the first column part. Furthermore, the fourth fraction is advantageously formed from a bottom product of the second column part and the fifth fraction from a top product of the second column part. It is particularly advantageous in this case if a portion of the bottom product of the first column part that is not used as the second fraction, and a portion of the bottom product of the second column part that is not used as the fourth fraction, are each vaporised and recycled into the corresponding column. By contrast, a portion of the top product of the second column part that is not used as the fifth fraction is advantageously liquefied and fed as reflux to the second column part. Advantageously, the third feed mixture is fed into the first column part in liquid form at least in part, that is to say optionally also vaporised in part, and the fourth feed mixture is fed into the second column part in gas form.

It is particularly advantageous if fluid is withdrawn from a middle region of the second column part and fed as liquid reflux to the first column part. In this manner, a condenser system for the first column part is not needed, it being possible to operate the first column part using the mentioned fluid stream as reflux.

The present invention likewise relates to a system for processing a mixture of substances which contains predominantly or solely hydrocarbons having from M to N carbon atoms and sulfur compounds. The system has all the means which make it able to carry out a method set out above. For details, reference is made to the corresponding independent claim. A corresponding system benefits from the advantages discussed above, to which reference is therefore explicitly made.

Preferred embodiments will be discussed in the following in comparison to the prior art with reference to the accompanying figures.

BRIEF DESCRIPTION OF THE DRAWING

The FIGURE is a schematic process flow diagram illustrating a method according to an embodiment of the invention.

DETAILED DESCRIPTION OF THE DRAWING

The FIGURE is a schematic process flow diagram illustrating a method according to an embodiment of the invention, which method is generally designated 100. The method will be described in the following with reference to a mixture of substances which contains from five to twelve carbon atoms, which include sulfur-containing hydrocarbons. However, the method is also suitable, as explained several times, for other mixtures of substances.

In the example shown, fluid of a corresponding mixture of substances is supplied as stream a to a separation 10, where it forms part of a feed (referred to above and in the following as the "first" feed). The first feed is further formed using fluid of a further mixture of substances, here illustrated by stream f, as explained below.

In the separation 10 which is referred to in the present application as the "first" separation, two fractions are formed and provided in the example shown in the form of streams b and c. The fraction corresponding to stream b is here referred to as the "first" fraction. The first fraction, and thus stream b, can contain, for example, predominantly or solely hydrocarbons having five and six carbon atoms. Because the fluid of the original mixture of substances supplied in the form of stream a contains sulfur-containing hydrocarbons, these or some of these sulfur-containing hydrocarbons are also contained in the fluid of stream b. A further fraction in the form of the mentioned stream c is in addition formed in the first separation 10, which further fraction in the example shown can contain predominantly or solely hydrocarbons having from seven to twelve carbon atoms. Depending on the selectivity, the hydrocarbons having the respective limit number of carbon atoms, that is to say here six or seven, also pass into both fractions, that is to say the first and the further fraction.

Using fluid of the first fraction, that is to say of stream b, a feed is formed which is referred to within the scope of this application as the "second" feed. The second feed is supplied to a desulfurisation 20, which operates as described above. This means that the sulfur-containing hydrocarbons contained in the second feed, that is to say the sulfur-containing hydrocarbons in stream b, are converted predominantly or completely in the desulfurisation 20. Furthermore, secondary products in the form of heavier hydrocarbons, as discussed, for example, in the form of di- and/or oligomers, are also formed in the desulfurisation 20. A product mixture formed in the desulfurisation 20 is supplied in the form of stream d as a "third" feed in liquid form to a two-part distillation column 30, where it is first subjected in a first column part 31 to a separation, which is here referred to as the "second" separation. In the second separation in the first column part 31, a bottom product is formed which can be discharged from the first column part in the form of stream e, vaporised in part in a bottom reboiler which is not separate, for example using medium-pressure steam, and recycled in part in gas form into the first column part 31. A portion of stream e that has not been vaporised is recycled into the first separation 10 in the form of stream f which has already been mentioned. In this case, stream f is formed of a fraction which is here referred to as the "second" fraction and contains the predominant portion of the secondary products contained in the third feed, that is to say in stream d.

A gas mixture obtained at the top of the first column part 31 is therefore free or largely free of corresponding secondary products. A stream g is drawn off in gas form from the top of the first column part 31 that carries out the second separation. In this case, stream g forms a fraction which is referred to within the scope of the present application as the "third" fraction. In the example shown, this third fraction is transferred in part or completely into the second column part 32, where it is fed into a middle region as a "fourth" feed.

The second column part 32, which is arranged above the first column part 31, is designed to carry out a further separation, which is referred to within the scope of the present application as the "third" separation. In the third separation in the second column part 32, a liquid bottom product is likewise formed, which is drawn off in the form of stream h and can likewise be vaporised in part in a bottom reboiler which is not designated separately. The bottom reboiler of the second column part 32 can likewise be operated, for example, using medium-pressure steam. A portion of stream h which is vaporised in the bottom reboiler is recycled into the second column part, where it rises as steam. A portion that is not vaporised in the corresponding bottom reboiler is discharged in the form of stream i, optionally cooled in a heat exchanger 33, and provided as a benzene-rich fraction. The fraction provided in the form of stream i is referred to within the scope of this application as the "fourth" fraction and contains at least the predominant portion of the hydrocarbons having six carbon atoms contained in the fourth feed, that is to say in stream g.

Accordingly, a top product of the second column 32 is free or predominantly free of hydrocarbons having six carbon atoms and thus partially or completely free of aromatic compounds, in particular benzene. A top product of the second column part 32 is drawn off in the form of stream k, condensed in part in a condenser 34, for example using cooling water, and then transferred, for example, to a separator 35. In the separator 35, a stream l is obtained, part of which, in the form of stream m, can be pumped by means of a pump 36 back to the second column part 32, where it serves as reflux. A remaining stream n constitutes a further fraction, which is referred to within the scope of the present application as the "fifth" fraction and which is low in or free of hydrocarbons having six carbon atoms. In addition, volatile hydrocarbons having four and optionally five carbon atoms, hydrogen sulfide and optionally residual hydrogen can be withdrawn from the separator 35 in the form of stream o, and optionally a water-containing oil fraction can be withdrawn in the form of stream p. Stream o can be guided, for example, into a crude gas compression of an olefin plant.

It is particularly advantageous if a liquid is withdrawn from the second column part in a middle region from a liquid retaining device and transferred in the form of stream r into the first column part. Stream r forms the reflux to the first column part and in particular prevents heavy hydrocarbons such as the mentioned secondary products from being able to pass from the first column part 31 into the second column part 32.

The invention claimed is:

1. A method (100) for processing a mixture of substances which contains predominantly or solely hydrocarbons having from M to N carbon atoms, which include sulfur-containing hydrocarbons, a first feed being formed using a fluid of the mixture of substances and being subjected to a first separation in which a first fraction is formed which contains predominantly or solely hydrocarbons having from X to Y carbon atoms and at least a portion of the sulfur-containing hydrocarbons contained in the first feed, and a second feed being formed using a fluid of the first fraction and being subjected to a desulfurisation, in which the sulfur-containing hydrocarbons contained in the second feed are converted predominantly or completely and hydrocarbons having more than Y carbon atoms are formed as secondary products, with the result that a product mixture of the desulfurisation contains predominantly or solely hydrocarbons having from X to Y carbon atoms and the secondary products, where M is five or six, X is five or six when M is five or is six when M is six, Y is six, seven or eight, and N is greater than Y, characterised in that a third feed is formed using a fluid of the product mixture and is subjected to a second separation in a two-part distillation column (30) which comprises two structurally separated column parts (31, 32) and in which a second and a third fraction are formed, the second fraction containing at least the predominant portion of the secondary products contained in the third feed, and fluid of the third fraction is separated further in the two-part distillation column in a third separation, and fluid of the second fraction is used in the formation of the first feed by being recycled into the method (100) upstream of the first separation.

2. The method (100) according to claim 1, in which the second and the third fraction each contain a portion of the hydrocarbons having Y or fewer carbon atoms contained in the third feed.

3. The method (100) according to claim 2, in which a fourth feed is formed using the fluid of the third fraction and is subjected to the third separation, wherein a fourth and a fifth fraction are formed in the third separation, wherein the fourth fraction contains at least the predominant portion of the hydrocarbons having six carbon atoms contained in the fourth feed, and the fifth fraction is low in or free of hydrocarbons having six carbon atoms.

4. The method according to claim 3, in which the hydrocarbons having from M to N carbon atoms contained in the mixture of substances include aromatic compounds having six, six and seven or from six to eight carbon atoms which are at least in part also contained in the fourth feed mixture, wherein the fourth fraction contains at least the predominant portion of the aromatic compounds contained in the third feed mixture.

5. The method according to claim 1, in which M and X are five or six, and in which, in the first separation to which the first feed mixture is subjected, a further fraction is additionally formed which contains predominantly or solely hydrocarbons having from Y to N carbon atoms.

6. The method according to claim 1, in which the mixture of substances is a pyrolysis gasoline fraction which is obtained from a stream taken from a steam cracking process.

7. The method according to claim 1, in which a two-part distillation column (30) having a first column part (31) and a second column part (32) arranged above the first column part (31) is used, wherein the second separation is carried out in the first column part (31) and the third separation is carried out in the second column part (32).

8. The method according to claim 7, in which the second fraction is formed from a bottom product of the first column part (31) and the third fraction is formed from a top product of the first column part (31).

9. The method according to claim 8, in which the fourth fraction is formed from a bottom product of the second column part (32) and the fifth fraction is formed from a top product of the second column part (32).

10. The method according to claim 9, in which a portion of the bottom product of the first column part (31) that is not used as the second fraction, and a portion of the bottom product of the second column part (32) that is not used as the fourth fraction are vaporised and recycled into the respective columns.

11. The method according to claim 9, in which a portion of the top product of the second column part (32) that is not used as the fifth fraction is liquefied and fed as reflux to the second column part.

12. The method according to claim 7, in which the third feed mixture is fed into the first column part (31) in liquid form at least in part, and the fourth feed mixture is fed into the second column part (31) in gas form.

13. The method according to claim 7, in which a fluid is withdrawn from a middle region of the second column part (32) and fed as reflux to the first column part (31).

14. A system for processing a mixture of substances which contains predominantly or solely hydrocarbons having from M to N carbon atoms, which include sulfur-containing hydrocarbons, the system having means which are designed to form a first feed using a fluid of the mixture of substances and subject the first feed to a first separation in which a first fraction is formed which contains predominantly or solely hydrocarbons having from X to Y carbon atoms and at least a portion of the sulfur-containing hydrocarbons previously contained in the mixture of substances, and to form a second feed using a fluid of the first fraction and subject the second feed to a desulfurisation, in which the sulfur-containing hydrocarbons contained in the second feed are converted at least predominantly and hydrocarbons having more than Y carbon atoms are formed as secondary products, with the result that a product mixture of the desulfurisation contains predominantly or solely hydrocarbons having from X to Y carbon atoms and the secondary products, where M is five or six, X is five or six when M is five or is six when M is six, Y is six, seven or eight, and N is greater than Y, characterised by means which are designed to form a third feed using the fluid of the product mixture and subject the third feed to a second separation in a two-part distillation column (30) which comprises two structurally separated column parts (31, 32) and in which a second and a third fraction are formed, the second fraction containing at least the predominant portion of the secondary products contained in the second separation feed, to further separate a fluid of the third fraction in the two-part distillation column, and to use a fluid of the second fraction in forming the first feed by recycling the fluid of the second fraction into an upstream of the first separation.

* * * * *